United States Patent [19]
Chase

[11] 3,709,242
[45] Jan. 9, 1973

[54] PRESSURE REGULATOR

[75] Inventor: Charles P. Chase, La Habra, Calif.

[73] Assignee: Beckman Instrument, Inc.

[22] Filed: Dec. 4, 1970

[21] Appl. No.: 95,202

[52] U.S. Cl. ................................137/81, 137/505.18
[51] Int. Cl. ..................................................F16k 31/145
[58] Field of Search..........................137/505.18, 81

[56]  References Cited

UNITED STATES PATENTS

| | | | |
|---|---|---|---|
| 3,319,649 | 5/1967 | Cummins | 137/505.18 |
| 298,687 | 5/1884 | Gooding | 137/505.18 |
| 2,320,886 | 6/1943 | Quiroz | 137/505.42 X |
| 3,137,308 | 6/1964 | Machlauski | 137/505.18 X |
| 2,091,051 | 8/1937 | Mesinger | 137/505.18 |

Primary Examiner—Harold W. Weakley
Attorney—Thomas L. Peterson and Robert J. Steinmeyer

[57]  ABSTRACT

A pressure regulator employing a hollow bellows containing a precise amount of gas which provides the reference pressure source for the regulator. The bellows is mounted in one chamber of the regulator housing while a valve element is mounted in a second chamber. One end of the element extends through a port interconnecting the two chambers and is connected to the bellows. An inlet port in the housing communicates with the chamber containing the valve element while an outlet port provides communication between the bellows chamber and the exterior of the housing. As pressure increases at the outlet port, the bellows compresses causing the valve element to close the port interconnecting the two chambers within the housing.

1 Claim, 1 Drawing Figure

PATENTED JAN 9 1973
3,709,242
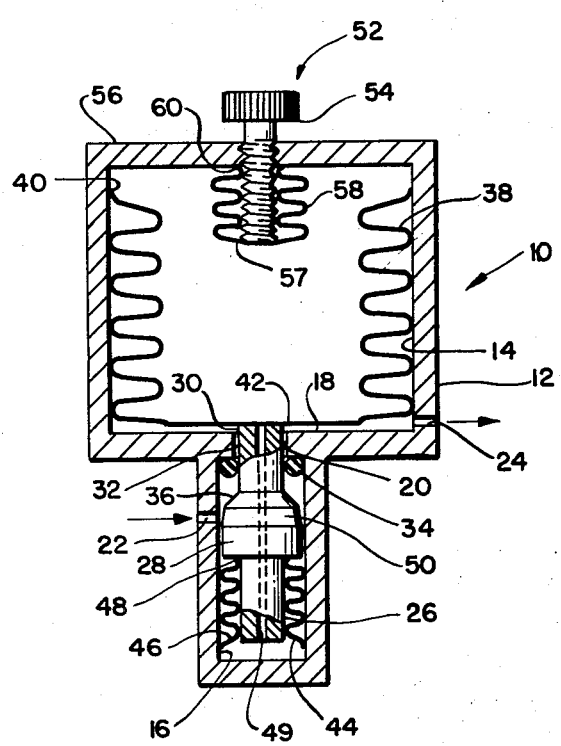
INVENTOR.
CHARLES P. CHASE
BY Thomas L Peterson
ATTORNEY

PRESSURE REGULATOR

BACKGROUND OF THE INVENTION

1. Field of the Invention

This invention relates to a pressure regulator and, more particularly, to a pressure regulator which will maintain an output pressure within narrow limits despite a variation in the input pressure extending over a wide range.

2. Description of the Prior Art

Certain aircraft controls utilize pressure regulators in which a spring force acting upon an effective area is balanced against gas pressure, said spring force being varied to automatically change the outlet pressure and thereby balance the new spring load. In this type of common regulator the effective area is furnished by a piston or diaphragm, the spring side of which is opened to atmospheric pressure, and the regulated gas pressure on one side of the piston or diaphragm must balance the spring force plus the atmospheric pressure on the other side of said piston or diaphragm. Thus, there results a corresponding change of fluctuation in the regulated or outlet pressure with changes in altitude. However, many controls in air or space craft require an absolute pressure regulator wherein the outlet or regulated pressure remains at a constant value regardless of changes in the surrounding atmospheric conditions. The subject invention is concerned with such a regulator, and particularly one which is light weight, easy to miniaturize, and can operate and regulate reliably independent of ambient pressure conditions, and even in vacuum environments.

SUMMARY OF THE INVENTION

According to the principal aspect of the present invention, there is provided a pressure regulator employing a hollow bellows containing a precise amount of gas which provides the reference pressure source for the regulator. The bellows is mounted in one chamber of the regulator housing while a valve element is mounted in a second chamber. One end of the element extends through a port interconnecting the two chambers and is connected to the bellows. An inlet port in the housing communicates with the chamber containing the valve element while an outlet port provides communication between the bellows chamber and the exterior of the housing. As pressure increases at the outlet port, the bellows compresses causing the valve element to close the port interconnecting the two chambers within the housing.

BRIEF DESCRIPTION OF THE DRAWING

The drawing illustrates in partial longitudinal section the preferred form of a pressure regulator constructed in accordance with the present invention.

DESCRIPTION OF THE PREFERRED EMBODIMENT

Referring now to the drawing in detail, the pressure regulator of the present invention, generally designated 10, comprises a housing 12 which is divided into an upper cylindrical chamber 14 and a lower, smaller-diameter cylindrical chamber 16 by a wall 18. A vertically extending passage 20 connects the two chambers. An inlet port 22 is provided in the housing to connect the lower chamber to a variable pressure supply (not shown) while an outlet port or regulated pressure port 24 communicates the upper chamber 14 of the housing to the exterior thereof.

An elongated valve element 26 is mounted for vertical sliding movement within the lower chamber 16. The outer periphery 28 of the valve element is cylindrical and in sliding engagement with the cylindrical wall of the lower chamber 16. The upper end 30 of the valve element extends through the passage 20 into the upper chamber. Preferably the upper end 30 of the valve element and the passage 20 are cylindrical, and are spaced from one another to provide therebetween an annular valve port 32. An O-ring 34 is positioned in the upper portion of the lower chamber 16 around the periphery of the valve port 32. The lower surface of the O-ring 34 provides a downwardly facing valve seat which is engageable by an upwardly facing annular surface 36 formed on the valve element 26.

A hollow metal bellows 38 is positioned within the upper chamber 14 with its longitudinal axis coaxial with the longitudinal axis of the valve element 26. The upper end 40 of the bellows is attached and sealed by any suitable means to the upper portion of the wall of the upper chamber 14 while the lower closed end 42 of the bellows is attached in sealing relationship to the upper end 30 of valve element 26.

A second metal bellows 44 is positioned in the lower end of lower chamber 16 with its longitudinal axis coaxial with the longitudinal axis of valve element 26. The lower end 46 of bellows 44 is fixedly sealed to the wall at the lower end of chamber 16 while the upper end 48 of the bellows 44 is sealed to the valve element. A passage 49 extends vertically through the valve element 26 to provide flow communication between the interior of the bellows 38 and 44.

As can be seen in the drawing, the surface 50 of the valve element below the upwardly facing annular surface 36 tapers downwardly and outwardly to the outer periphery 28 of the element. The valve element 26 is shown in the drawing as being in its lowermost position, in which position the tapered surface 50 is adjacent to the inlet port 22 of the pressure regulator. When the valve element 26 is moved to its uppermost position so that the annular surface 36 thereon engages the O-ring 34, the valve port 32 will be closed thereby preventing any flow between the inlet port 22 and outlet port 24.

During assembly of the regulator 10, the bellows 38 is filled with a precise amount of pressurized gas. The elastic properties of the pressurized gas are relied upon to provide the pressure regulating source within the assembly. No springs are utilized in the regulator and therefore the gas filled bellows 38 constitutes the sole means for providing a reference pressure source for the regulator. The passage 49 in the valve 26 allows for a balancing of pressure on opposite sides of the element, so that the pressure regulator will operate independently of ambient pressure conditions or variations thereof.

In operation of the regulator 10, as the downstream pressure connected to the outlet port 24 increases, the build-up of pressure within the upper chamber 14 compresses the bellows 38 thereby lifting the valve element 26 within the lower chamber 16. As the valve element rises, the flow of fluid through the port 32 will gradually decrease due to the tapered surface 50 on the element. Thus, such surface in cooperation with the outer periphery 28 of the valve element sliding against the inner wall of the chamber 16 forms a variable restrictor, allowing for smooth pressure regulation by the assembly. Further increase in downstream pressure causes the surface 36 on valve element 26 to seat firmly against the O-ring 34, completely stopping flow of fluid from port 22 through the annular valve port 32 to the outlet port 24. Conversely, a decrease in pressure at the outlet 24 will allow the valve element 26 to return to its lowermost position as shown in the drawing.

Adjustable means, generally designated 52, are provided for varying the volume of the upper bellows 38 and thus the reference pressure source of the regulator. Such means includes a set screw 54 which is threaded through the upper wall 56 of housing 12. The set screw is sealed at its lower end to the closed end 57 of a small metal bellows 58. The upper end 60 of the bellows 58 is sealed to the wall of the housing 12. By simply threading the set screw 54 in or out of the housing, the pressure of the gas within the bellows 38 may be selectively changed to adjust the regulated pressure to the desired value.

It can be appreciated that by the use of gas impervious metal bellows in the regulator 10, external leakage is eliminated and by the use of such bellows in the particular regulator configuration disclosed herein, reliable pressure regulation may be achieved independent of ambient pressure conditions, and even in vacuum environments.

Although only one embodiment of the invention has been disclosed herein for purposes of illustration, it will be understood that various changes can be made in the form, details, arrangement and proportions of the various parts in such embodiment without departing from the spirit and scope of the invention as defined by the appended claims.

What is claimed is:
1. A pressure regulator comprising:
a housing divided into upper and lower chambers by a wall;
a passage extending through said wall communicating said chambers;
a valve element mounted for vertical movement in said lower chamber, the upper end of said valve element extending into said upper chamber through said passage but being spaced from the wall of said passage to provide a valve port;
a downwardly facing annular valve seat in said lower chamber adjacent to said valve port;
an upwardly facing annular surface on said valve element engageable with said valve seat;
hollow bellows means in said upper chamber having an upper end fixedly mounted to the wall of said upper chamber and having a lower end attached in sealing relationship to said upper end of said valve element, said bellows means being adapted to hold a precise amount of gas whereby the gas-filled bellows means provides the reference pressure source for the regulator;
a first port in said housing communicating said upper chamber with the exterior of said housing;
a second port in said housing communicating the lower chamber with the exterior of said housing;
in the lowermost position of said valve element within said lower chamber, said first and second ports being in communication with each other through said valve port;
in the uppermost position of said valve element within said lower chamber, said annular surface on said valve element engaging said annular valve seat to close said valve port and thereby prevent flow communication between said first and second ports;
second hollow bellows means in said lower chamber having an upper end sealed to said valve element and a lower end fixedly mounted to the wall of said lower chamber; and
a passage extending through said valve element communicating the interiors of said two bellows means, said interiors of said two bellows means being isolated from the exterior of said housing.

* * * * *